(12) United States Patent
Hahn et al.

(10) Patent No.: US 6,230,029 B1
(45) Date of Patent: *May 8, 2001

(54) MODULAR WIRELESS HEADSET SYSTEM

(75) Inventors: Stan S. Hahn, Moraga; Genrik Yegiazaryan, Lafayette; Sung Kee Baek, Martinez; David S. Hishinuma, Fremont; Robert Jetter, Oakland, all of CA (US)

(73) Assignee: Advanced Mobile Solutions, Inc., Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/004,178

(22) Filed: Jan. 7, 1998

(51) Int. Cl.[7] ............................. H04B 1/38; H04B 5/06

(52) U.S. Cl. ........................ 455/568; 455/41; 455/66; 455/550; 455/568; 455/569; 379/430

(58) Field of Search ............................ 455/569, 550, 455/568, 572, 575, 11.1, 41, 66, 90; 379/430

(56) References Cited

U.S. PATENT DOCUMENTS

| | | | |
|---|---|---|---|
| 4,558,178 | 12/1985 | Yasuda et al. ................. 179/2 |
| 4,584,707 | 4/1986 | Goldberg et al. ............... 455/41 |
| 4,881,616 | 11/1989 | Janssen et al. ................. 181/129 |
| 4,882,745 | 11/1989 | Silver ............................. 379/61 |
| 4,930,148 | 5/1990 | Lee ................................ 379/58 |
| 5,054,112 | 10/1991 | Ike ................................. 455/41 |
| 5,073,972 | 12/1991 | Tendler et al. ................. 455/35 |
| 5,099,514 | 3/1992 | Acree ............................ 379/441 |
| 5,113,428 | * 5/1992 | Fitzgerald ...................... 455/568 |
| 5,191,602 | 3/1993 | Regen et al. ................... 379/58 |
| 5,220,677 | 6/1993 | Brooks .......................... 455/53.1 |
| 5,335,313 | 8/1994 | Douglas ......................... 395/2.84 |
| 5,365,573 | 11/1994 | Sakamoto et al. ............. 379/61 |
| 5,418,836 | 5/1995 | Yazaki ........................... 379/58 |
| 5,418,839 | * 5/1995 | Knuth et al. ................... 455/464 |
| 5,426,689 | 6/1995 | Griffith et al. ................. 379/58 |
| 5,450,496 | 9/1995 | Burris et al. ................... 381/183 |
| 5,452,474 | 9/1995 | Kagawa ......................... 455/89 |
| 5,457,751 | 10/1995 | Such .............................. 381/183 |
| 5,479,522 | 12/1995 | Lindemann et al. ........... 381/68.2 |
| 5,526,403 | * 6/1996 | Tam ............................... 455/426 |
| 5,533,122 | 7/1996 | Gattey et al. .................. 379/430 |
| 5,535,274 | 7/1996 | Braitberg et al. .............. 379/446 |
| 5,551,065 | 8/1996 | Honore ........................... 455/66 |
| 5,555,449 | 9/1996 | Kim ............................... 455/89 |
| 5,568,516 | 10/1996 | Strolhallen et al. ............ 375/259 |
| 5,568,537 | 10/1996 | Schechet ........................ 379/58 |
| 5,588,041 | 12/1996 | Meyer, Jr. et al. ............. 379/59 |
| 5,590,407 | 12/1996 | Ishikawa et al. ............... 455/66 |
| 5,590,417 | 12/1996 | Rydbeck ........................ 455/89 |
| 5,602,902 | 2/1997 | Satterlund et al. ............. 379/59 |
| 5,613,222 | 3/1997 | Guenther ....................... 455/89 |
| 5,623,544 | 4/1997 | Papadopoulos ................ 379/413 |
| 5,642,402 | 6/1997 | Vilmi et al. .................... 379/58 |
| 5,655,026 | * 8/1997 | Peters et al. ................... 381/385 |
| 5,659,594 | 8/1997 | Toda .............................. 455/552 |
| 5,761,298 | * 6/1998 | Davis et al. .................... 379/430 |
| 5,771,438 | * 6/1998 | Palermo et al. ................ 455/41 |
| 5,775,558 | * 7/1998 | Montalbano .................... 224/627 |
| 5,790,683 | * 8/1998 | Salzani ........................... 381/370 |
| 5,943,627 | * 8/1999 | Kim et al. ...................... 455/569 |

* cited by examiner

*Primary Examiner*—Lee Nguyen
*Assistant Examiner*—Simon Nguyen
(74) *Attorney, Agent, or Firm*—Malcolm B. Wittenberg; Crosby, Heafey Roach & May

(57) ABSTRACT

A wireless headset system for use with, e.g. mobile phones, and which incorporates a wireless headset which communicates with a base station via magnetic inductive coupling or radio frequency signals to dial and send or receive calls via a conventional phone, e.g. a mobile phone, attached to the base station. In one embodiment, the mobile phone is carried in the base station which is worn by the user.

30 Claims, 7 Drawing Sheets

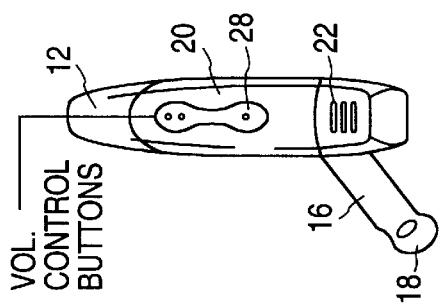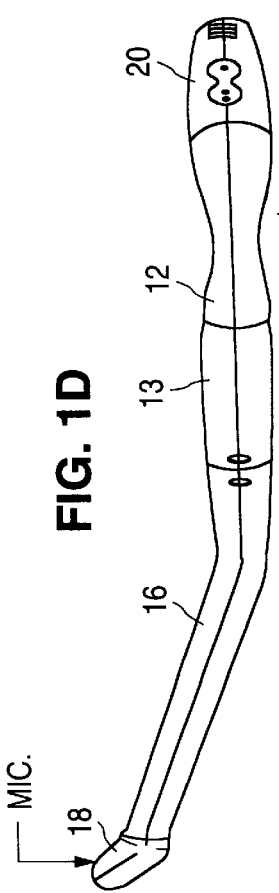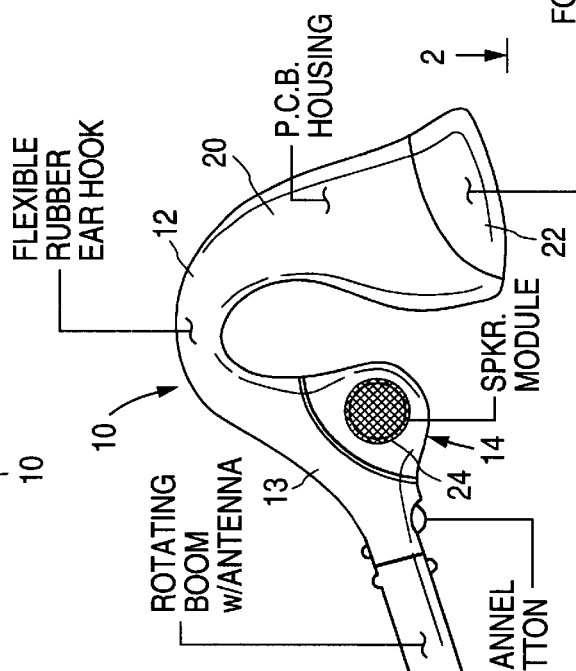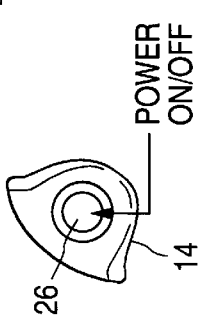

MODULAR WIRELESS HEADSET SYSTEM

FIELD OF THE INVENTION

The present invention relates to a wireless headset system for hands free talking over a conventional phone unit and more particularly to a modular wireless headset system which is readily adaptable for use with mobile phones in different configurations.

DISCUSSION OF THE RELATED ART

Using a conventional phone entails holding the receiver unit to the user's ear and this can be either tiring during long phone conversations or awkward in the case of using a cellular phone while performing some tasks such as driving an automobile. Therefore, there is a need for providing a wireless headset to allow talking over a phone while leaving the user's hands free to perform some other task.

Most conventional headsets are connected to a base station by means of a wire. While this provides a secure communication link between the headset and the base station, the wire both limits the mobility of the user and is inconvenient for purposes of storage. A wireless headset, on the other hand, provides the convenience of mobility and eliminates the problem of storing the connecting wire.

With the wide acceptability of mobile telephones, such as cellular telephones and PCS telephones, there has developed the need for a wireless headset which is compatible with such mobile phones in order to enable the user to perform tasks with both hands while carrying on a conversation or even dialing over the mobile phone. There is therefore a need for a wireless headset system which can conveniently be adapted for use with conventional mobile phones. However, conventional wireless headsets have heretofore typically been designed only for use with a landline phone.

Further, there is a need for a wireless headset system which allows convenient removal of the various components so that they can be replaced with other modules to adapt the wireless headset system to different situations such as, for example, communication between the wireless headset and a stationary base station at some distance from the wireless headset or between the wireless headset and a cellular phone being worn by the user in relatively close proximity to the wireless headset.

Another problem of the typical conventional wireless headset has been its large size. The power requirements of conventional headsets require relatively large and heavy batteries to provide power for several hours of continuous use. This has necessitated that conventional headsets be relatively large and be worn over the user's head. There is a need for a headset which is small enough to be fitted against just one ear and which features an easily detachable battery pack.

SUMMARY OF THE INVENTION

The above and other deficiencies of prior art wireless headset systems are overcome by the present invention of a wireless headset system for communicating between a base station and a wireless headset worn by a user. In the present invention, the wireless headset includes an ear piece, an ear hook which is connected to one end of the ear piece and fits over the ear of a user, a speaker mounted on the ear piece and positioned to reproduce sounds into the ear of the user, a boom having one end mounted to another end of the ear piece, a microphone mounted on another end of the boom, a first transceiver mounted to another end of the ear hook and electrically connected to the speaker and to the microphone for wirelessly transmitting and receiving signals representative of audio signals between the wireless headset and the base station, and a detachable battery pack for powering the first transceiver.

The wireless headset system of the present invention further comprises a base station which includes a power interface for coupling the base station to an external source of electrical power, a phone interface for electronically coupling the base station to a phone, preferably a mobile phone, to allow the base station to communicate with the phone, and a second transceiver for wirelessly communicating between the phone interface and the first transceiver. In the preferred embodiment, the power interface of the base station further includes an interface for accepting and recharging the battery pack when it is detached from the wireless headset. A charged battery pack, when connected to this interface, can also be used for powering the base station. When the base station is connected to an external source of power, the battery pack connected to the interface is recharged.

In a preferred embodiment, the wireless headset is modular in construction so that various elements, e.g. the ear piece, ear hook and the first transceiver, for example, can be detached from each other. This allows transceivers of different capabilities to be readily substituted. For example, if the distance between the wireless headset and the base station is short, the first transceiver and the second transceiver can wirelessly communicate by magnetic inductive coupling. If the distance is long, the wireless communication can be by radio frequency transmission.

In the preferred embodiment, the ear hook is deformable toward the speaker and the speaker is non-pivotally mounted on the ear piece, so that the ear hook can be deformed to clamp the pinna of a user's ear between the ear hook and the speaker. The ear hook may deform in other directions as well to help fit the wireless headset module to the user's ear. In another embodiment, the ear hook is non-deformable toward the speaker but the speaker is pivotally mounted on the ear piece so that the speaker can be pivoted toward the ear hook to clamp the pinna of a user's ear between the ear hook and the speaker. The speaker could be pivotable in other directions as well to help fit the wireless headset module to the user's ear. In a preferred embodiment, the speaker can be detached from the ear piece and rotated 180° and then reattached to the ear piece. This allows the wireless headset to be worn on either ear of the user and with the speaker being directed into the auditory canal of the user's left ear or right ear.

In the preferred embodiment, the boom includes an antenna for the first transceiver. Further, in the preferred embodiment a power on/off switch for the first transceiver is mounted on the headset, for example on the housing for the first transceiver.

In the preferred embodiment, the first transceiver and the second transceiver communicate over a selected one of a plurality of transmission channels, and the wireless headset further comprises a channel selector for selecting the one of the plurality of transmission channels. The channel selector can be mounted on the ear hook for convenient use.

In one preferred embodiment of the invention, the base station is intended for use within an automobile for communicating between the wireless headset and a mobile phone connected to the base station. In this embodiment the power interface includes a cigarette lighter adapter for plugging into a cigarette lighter socket of the user's automobile and a powercord for detachably connecting the cigarette lighter adapter to the base station. In another preferred embodiment, the base station acts as a carrier for a mobile phone and is worn by the user. In both of these embodiments the first transceiver and the second transceiver wirelessly communicate with each other via magnetic inductive coupling.

In operation, the user enters a car and attaches a mobile phone to a base station releasably mounted in the car. The user then positions the wireless headset module on his or her head. When an incoming call is received by the mobile phone, the user actuates an appropriate button on the mobile phone, e.g. the "talk" button, and the on/off button on the wireless headset module to receive the call. The user then communicates with the caller through the modular wireless headset without holding the mobile phone. This permits hands free communication. Furthermore, unlike current arrangements which rely on the use of speaker phones, the user and the caller may carry on a semi-private conversation that a passenger in an automobile cannot decipher because the passenger can't hear the caller's end of the conversation.

In several portable embodiment versions, the base station is physically and electrically connected to the mobile phone and is worn by the user, e.g. clipped to the user's belt. The user may then position the wireless headset on his or her head and receive incoming calls. Again, no wire connects the wireless headset to the base station, permitting the user to walk, bike, and still receive incoming calls without having to hold the mobile phone to his or her ear.

These and other objects, advantages, features of the invention will become more readily apparent in the nature of the invention more clearly understood by reference to the following detailed description of the invention, the intended claims, and the several drawings attached hereto.

BRIEF DESCRIPTION OF THE DRAWINGS

FIG. 1A is a vertical side view of the wireless headset module according to a first embodiment of the invention;

FIG. 1B is a vertical side view of the opposite side of the speaker module 14 depicted in FIG. 1A;

FIG. 1C is a vertical end view of the wireless headset module shown in FIG. 1A;

FIG. 1D is a top view of the wireless headset module shown in FIG. 1A with the microphone boom turned away from the speaking position;

DETAILED DESCRIPTION OF CERTAIN PREFERRED EMBODIMENTS

Figure 2A:
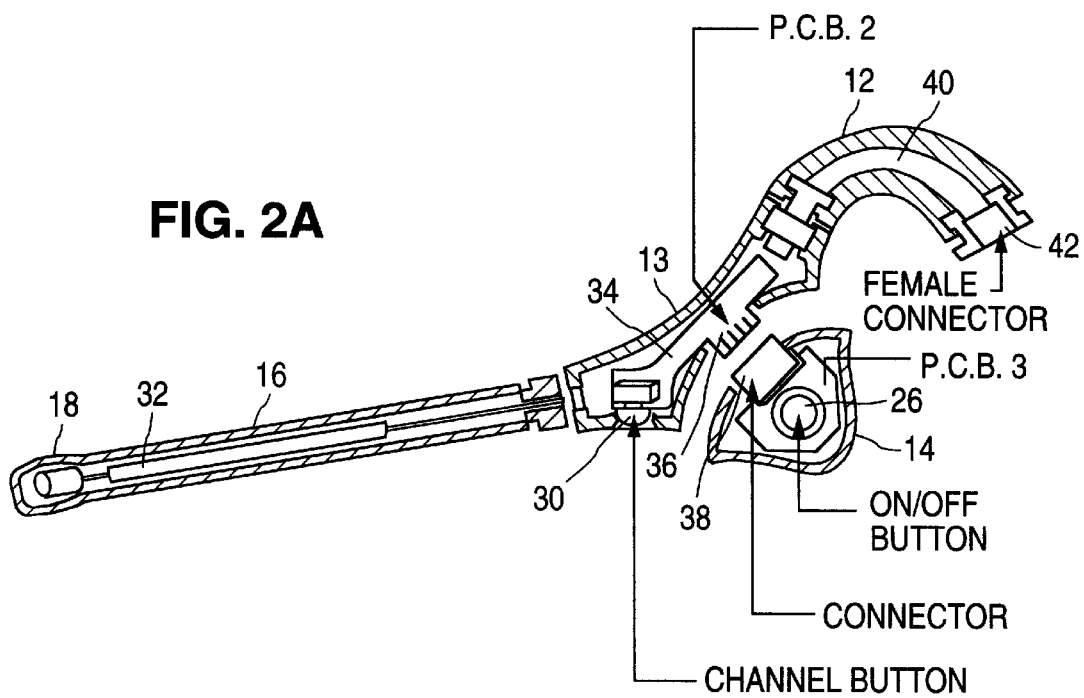
FIG. 2A is a vertical sectional view of the ear hook, speaker module and microphone boom of the wireless headset module shown in FIGS. 1A through 1D.

Referring now more particularly to FIGS. 1A through 1D, inclusive, the wireless modular headset system according to a first embodiment of the invention includes a wireless headset module 10 which comprises an ear piece 13 connected at one end to a flexible ear hook 12. A speaker module 14 is connected to the ear piece 13. Speaker module 14 can be detached from the ear piece 13, rotated 180° and reattached to the ear piece 13. This allows a speaker 24 positioned on one side of the speaker module 14 to face directly into either ear of the user of the modular wireless headset module. On the opposite side of the speaker module 14 is a power on/off button 26 for controlling the operation of the wireless headset module. The button 26 can also be mounted at other locations on the wireless headset.

Also attached to the ear piece 13 is a rotating boom 16 which has a slight angle to it, as best viewed in top view FIG. 1D. At the opposite end of the boom 16 is a microphone 18. The boom 16 can be rotated with respect to the ear piece 13 so that the microphone can be swung toward or away from the user's mouth when the wireless headset module is being worn by the user.

On the underside of the ear piece 13, between the point of attachment of the speaker module 14 and the boom 16, is a channel button 30 for selecting one of a plurality of communications channels over which signals are transmitted between the wireless headset module 10 and the base station 54 further described herein. On the back side of the transceiver 20 are volume control buttons 28.

Attached to the end of the ear hook 12, opposite from its point of attachment to the ear piece 13, is a transceiver module 20. At the end of the transceiver module 20, opposite from its point of attachment to the ear hook 12, is a battery module 22. The components 16, 13, 12, 20 and 22 are modular and can all be detached from each other and substitute components can be inserted as may be necessary for different configurations.

Figure 2B:
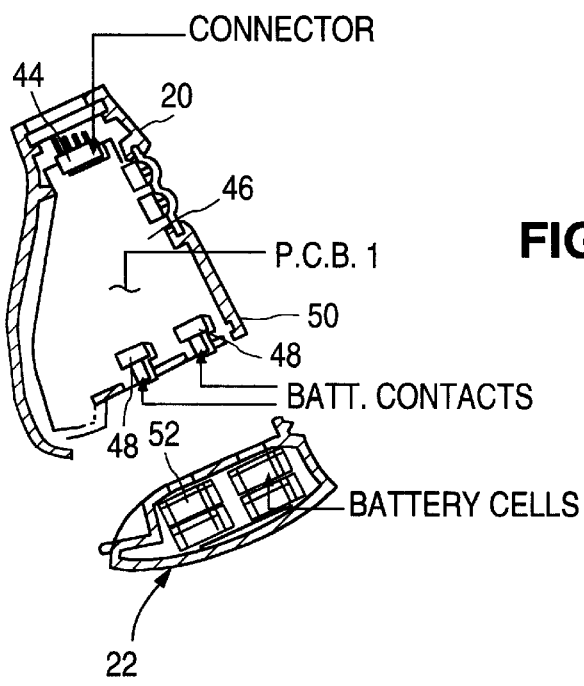
FIG. 2B is a vertical sectional view of the transceiver module and the battery module of the wireless headset module shown in FIGS. 1A through 1D.
Figure 2C:
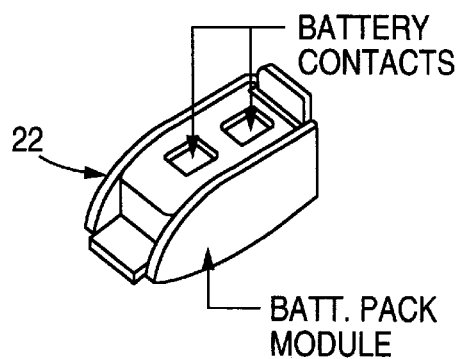
FIG. 2C is a perspective view of the battery pack module shown in FIG. 2B.

Referring now more particularly to FIGS. 2A and 2B, the wireless headset module is shown in cross-section. As can be seen in FIG. 2A, the boom 16 is hollow and includes wiring 32 for the microphone 18 to connect it to the transceiver module 20. In addition, the boom 1.6 is metallic and acts as an antenna for the transceiver module 20.

Within the hollow ear piece 13 is a first printed circuit board 34 having a set of plug-like contacts 36 which meet with a corresponding socket set of contacts 38 of the speaker module 14. By means of the contacts 36 and the socket 38 the speaker 24 and the on/off switch 26 are connected to the transceiver module 20.

A cable 40 within the ear piece 13 connects the printed circuit board 34 to a female connector 42 in the ear hook 12 which mates with a male connector 44 mounted on a printed circuit board 46 of the transceiver module 20. The connector 44 is at an end of the transceiver module 20 which attaches to the end of the ear hook 12. At an opposite end of the printed circuit board 46 are spring loaded battery contacts 48 which project through openings in the housing 50 of the transceiver module 20 and connect to a battery module 22.

As best seen in FIG. 2B, the battery module 22 houses a set of batteries 52 which are arranged and connected so that one side of at least a pair of batteries is in electrical contact with the battery contacts 48 when the battery module is connected to the end of the transceiver module 20.

Near the end of the ear piece 13, which attaches to the boom 16, is positioned the channel control switch 30. The channel control switch 30 is mounted on the printed circuit board 34 and electrically connected through it to the transceiver module printed circuit board 46.

In this embodiment, the portion of the ear hook 12 extending over the user's ear is made of a deformable material so that in order to comfortably position the wireless headset module 10 on a user's ear, the user would deform the ear hook portion 12 towards the speaker module 14 in order to clamp the pinna of the user's ear between the ear hook 12 and the speaker module 14 and thereby fasten the wireless headset module 10 to the user's ear.

In the arrangement shown in FIGS. 1A through 1D, the wireless headset module is intended to be worn on the user's right ear, that is the speaker 24 is positioned to be opposite the auditory canal of the user's right ear. As shown in FIG. 1D, the boom 16 is turned away from the user's mouth assuming that the wireless headset module is to be worn on the right ear. The user would then rotate the boom 16 to position the microphone 18 in front of the user's mouth. If the user wishes to mount the wireless headset module on the user's left ear, the user would remove the speaker module 14 by unplugging it from the printed circuit board 34, rotating the module 14 by 180°, and replugging it in. The contacts of the plug 36 and socket 38 are symmetrically arranged so that the correct connections are made no matter which orientation is adopted by the speaker module 14. In an orientation where the speaker 24 is positioned on the opposite side to that shown in FIG. 1A, the wireless headset module would be adapted for wearing on the user's left ear.

Figure 3:
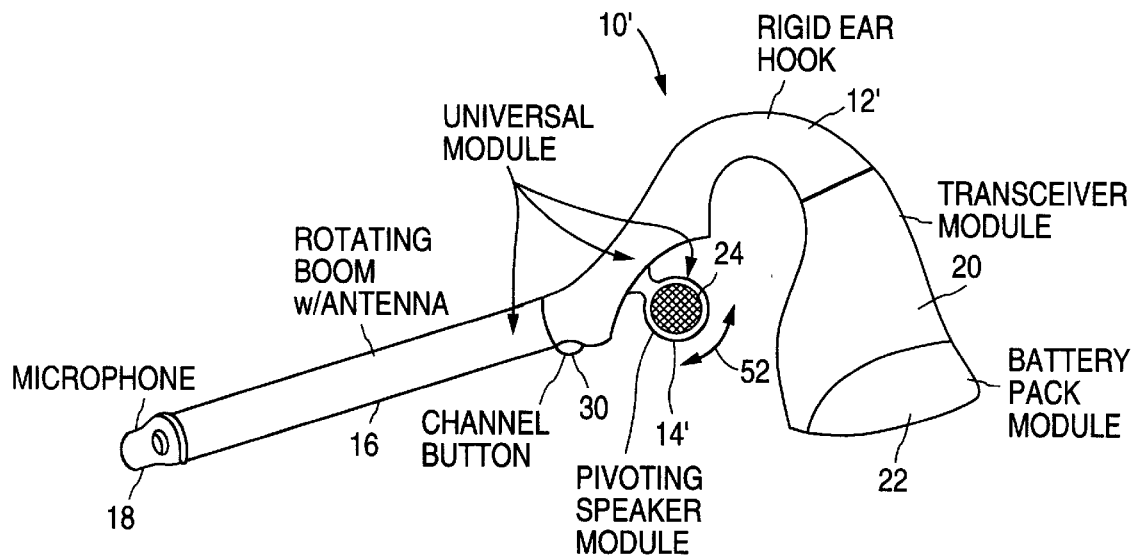
FIG. 3 is a vertical view of a second embodiment of a wireless headset module according to the invention.

Referring now more particularly to FIG. 3, a wireless headset module 10' of a second embodiment is illustrated. In this embodiment, the ear hook 12' is rigid and not deformable. On the other hand, the speaker module 14' is pivotally mounted to the ear piece 13' so that the speaker module can be movable in two or three dimensions as viewed in FIG. 3 to thereby shorten or lengthen the distance between the exterior of the speaker module 14' and the edge of the ear hook 12' in order to clamp the pinna of the user's ear between the speaker module 14' and the ear hook 12'.

In these embodiments, the ear hook 12 may be deformable in three dimensions or the speaker module 14' may be movable in two or three dimensions to allow for greater customization in the fitting of the wireless headset module to the user's ear.

Figure 4:
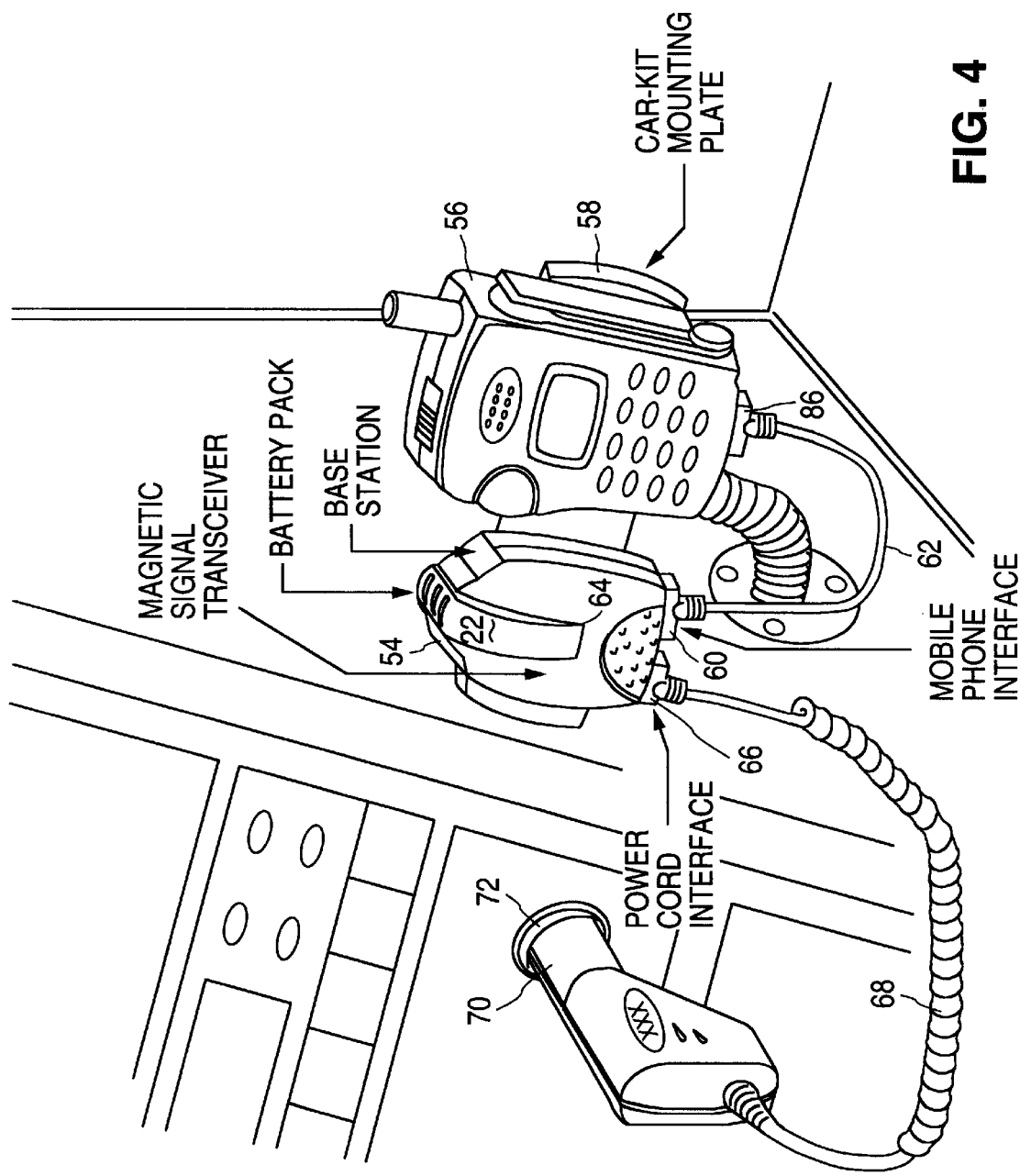
FIG. 4 is a perspective view of the modular wireless headset system as embodied in a configuration for use with a mobile phone in a personal automobile.

Referring now more particularly to FIG. 4, the base station of the modular wireless headset system is illustrated in an embodiment in which the base station is mounted within an automobile. In this embodiment, base station 54 and a cellular phone 56 are mounted in a carrier 58 which is attached to a portion of a dashboard or firewall of an automobile.

The base station 54 is provided with a phone interface 60 which is connected via a cable 62 to the mobile phone 56 to thereby electronically couple the base station 54 to the mobile phone 56 to allow the base station 54 to communicate with the phone 56. The base station provides a battery pack interface 64 for recharging a battery pack module 22 for use with the wireless headset module 10 when the base station 54 is supplied with power from an external source. When no external source of power is available, the battery pack module 22 attached to the battery pack interface 64 is used to power the base station 54. Thus, the battery pack module 22 is sized and shaped to be useable with either the wireless headset module 10 or the base station 54.

A power interface 66 of the base station 54 is connected via a cable 68 to a cigarette lighter adapter 70 which plugs into a socket 72 in the dashboard of the automobile. Within the base station 54 is a transceiver circuit 74 (shown only in FIG. 10) for wirelessly communicating between the base station 54 (and hence the phone 56) and the transceiver module 20 of the wireless headset 10.

In operation, the user would enter his or her car and attach his or her mobile phone 56 to the carrier 58 of the base station 54. The user would then position the wireless headset module 10 on his or her head. When an incoming call is received by the mobile phone 56, the user would actuate the appropriate button on the mobile phone 56, e.g. the "talk" button, and the on/off button 26 on the wireless headset module 10 to receive the call. The wireless headset module 10 and the base station 54 communicate with each other via magnetic inductive coupling. The base station 54 converts the signals received from wireless headset module 10 into signals that the mobile phone 56 can utilize and the signals from the mobile phone 56 into signals at the wireless headset module 10 can utilize. The base station 54 can receive power from, for example, the automobile's cigarette lighter socket 72 through the cigarette lighter adapter 70 or some other external power source or, when disconnected from such an external power source, will draw power from the attached battery pack. The base station 54 may also charge the batteries of the attached mobile phone 56 when connected to an external power source, e.g. the cigarette lighter adapter 70.

Figure 5:
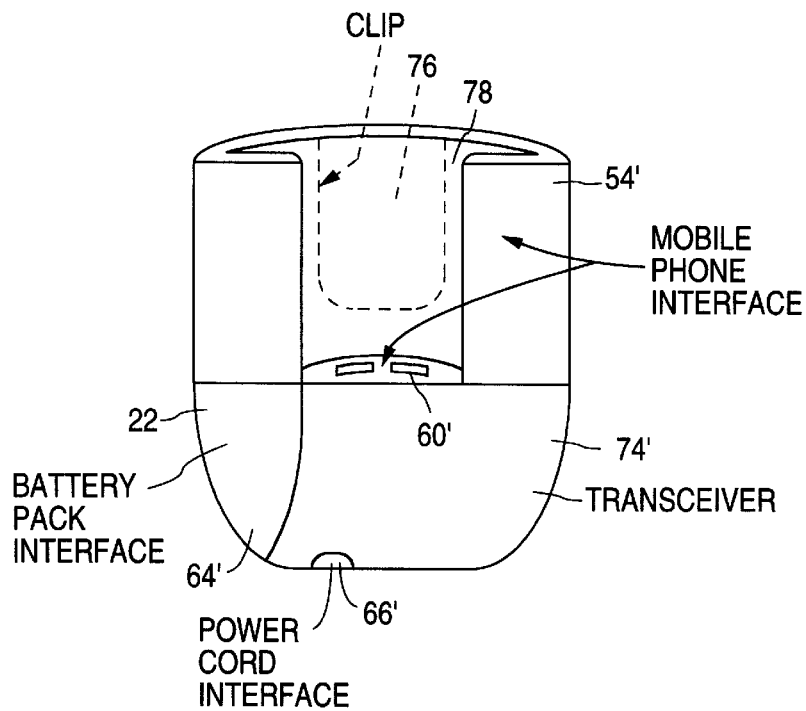
FIG. 5 is a vertical view of a second embodiment of the invention showing a base station intended to be worn by the user of the modular wireless headset system.

Referring now to FIG. 5, an alternative embodiment of the base station is depicted. In this embodiment, the base station is intended to be worn upon an article of clothing of the user. As shown, the base station 54' is in the form of a socket 78 for receiving and physically holding the mobile phone 56 (not shown in FIG. 5). At the bottom portion of the socket 78 is the phone interface 60' in the form of contacts which meet with corresponding contacts on the bottom of the mobile phone 56. The battery pack module 22 serves to power the base station 54' when the base station 54' is not connected through a power cord interface 66' to a source of power such as, for example, the cigarette lighter adapter and the cigarette lighter socket of an automobile.

The base station 54' is provided with a clip 76, which is shown in hidden line fashion since it is at the back of the base station 54' as viewed in FIG. 5. The clip 76 serves to attach the base station 54' to a belt or pocket flap of a shirt or pants worn by the user.

In operation, the base station, with the mobile phone inserted, is clipped by the user onto, e.g., the user's belt. The user may then position the wireless headset on his or her head and receive incoming calls as described above. In this embodiment, no wire connects the wireless headset to the base station, thereby permitting the user to walk, bike, and still receive incoming calls to his or her mobile phone without having to physically hold the mobile phone to his or her ear.

Figure 6:
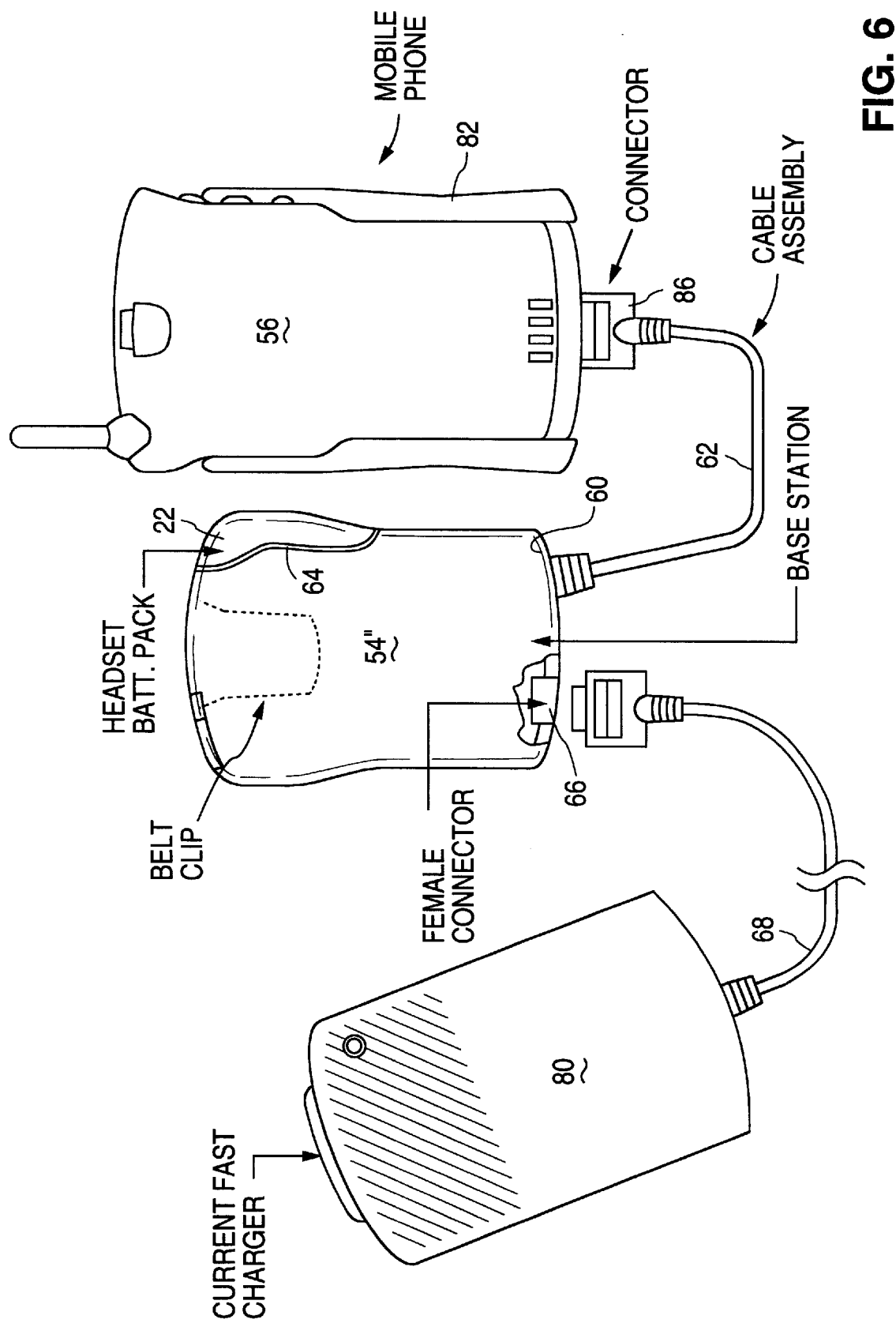
FIG. 6 is a vertical view of a third embodiment of the invention showing a base station intended to be worn by the user of the modular wireless headset system.

Alternatives of this embodiment are shown in FIGS. 6 to 9. Referring to FIG. 6, the mobile phone 56 is held in its own carrier 82 which is worn by the user. The phone 56 is connected via a connector plug 86, the cable 62, and the phone interface 60 to the base station 54". The base station 54" is also worn by the user, e.g. by a belt clip shown only in hidden line fashion. A battery pack module 22 is mounted on the base station 54" in the battery module interface 64 for powering the base station 54" when it is not connected to an external source of power and for being recharged when external power is being supplied via the power interface 66 connected by the cable 68 to an external power source 80.

Figure 7:
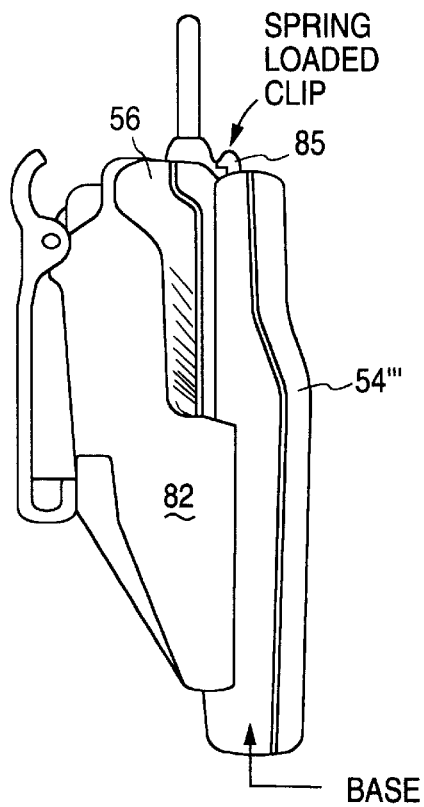
FIG. 7 is a side view of a fourth embodiment of the invention showing a base station intended to be worn by the user of the modular wireless headset system.
Figure 9:
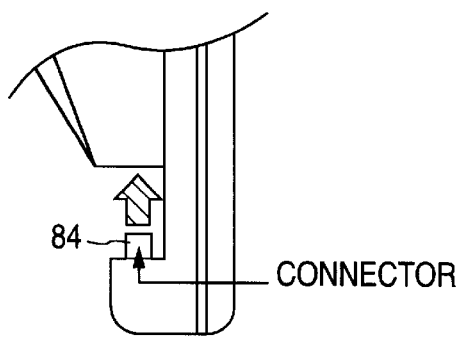
FIG. 9 is an enlarged detail view of the fourth embodiment of the invention showing the means of attaching the base station to the mobile phone.
Figure 8:
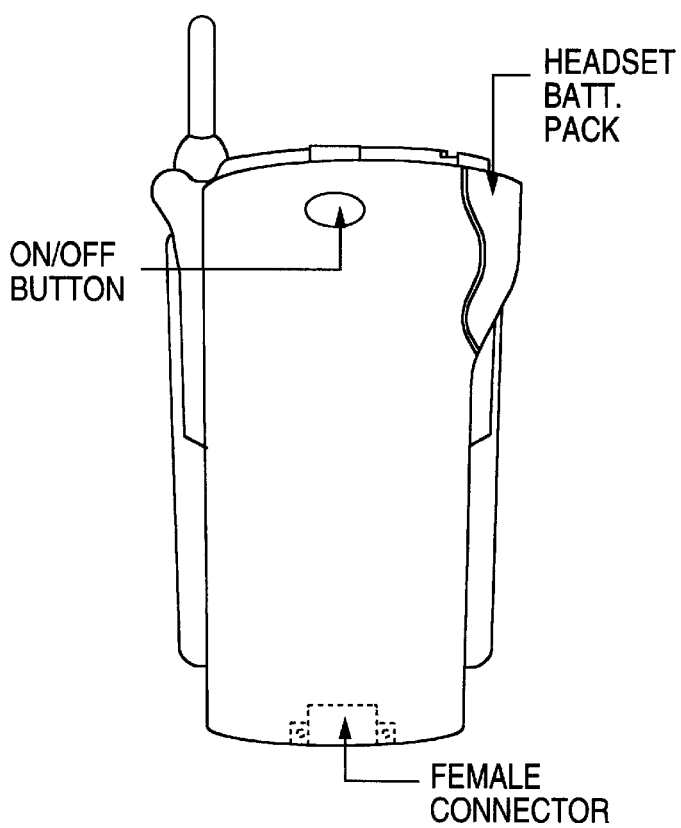
FIG. 8 is a vertical view of the fourth embodiment of the invention.

Referring now to FIGS. 7 to 9, inclusive, the mobile phone 56 is carried in its own holster 82 worn by the user and the base station 54''' is mounted on the outside of the phone 56. A hook 84 at the bottom of the base station 54''' engages a recess on the phone 56 or its holster 82 and a spring loaded hook 85 at the top of the base station 54''' engages a recess or depression on the phone 56. In all other respects, this embodiment operates similarly to the embodiment of FIG. 8.

Figure 10:
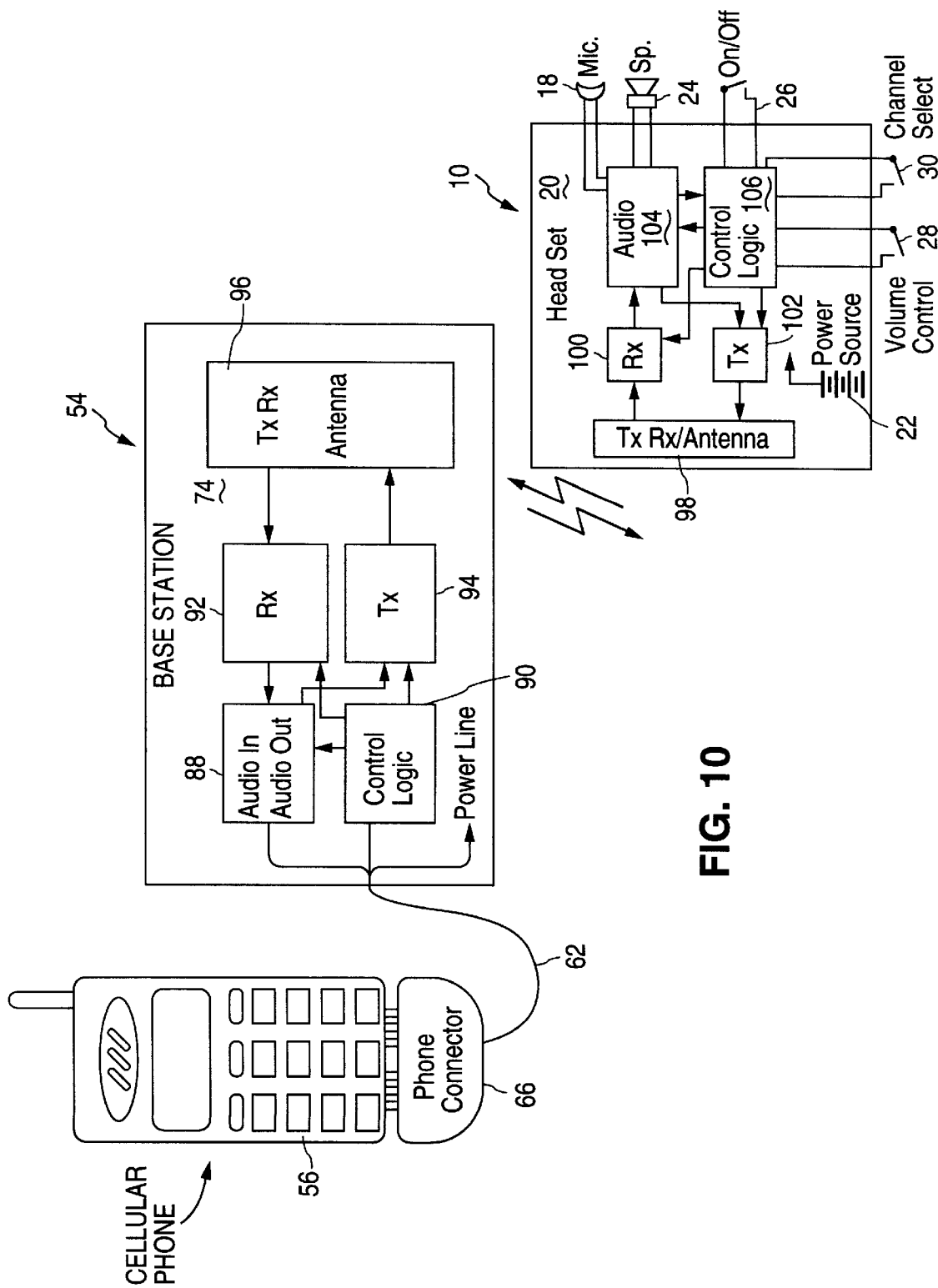
FIG. 10 is a schematic view of the circuitry of the modular wireless headset system of the invention.

Referring now more particularly to FIG. 10, a schematic diagram of the circuitry of the modular wireless headset system is depicted. The base station 54, as mentioned above, is connected via a cable 62 to the local phone 56. The cable 62 interfaces with the mobile phone 56 through a standard plug 86. Within the base station 54, the transceiver circuit 74 includes an audio input/output (I/O) circuit 88 which is connected to the cable 62, a receiver circuit 92, and a transmitting circuit 94. The audio I/O circuit 88 receives audio signals from the receiver circuit 92 and supplies audio signals to the transmitting circuit 94. A control logic circuit 90 controls the circuits 88, 92 and 94.

The transmitter 94 transmits wireless signals to the antenna 96. In one embodiment, the control logic circuit 90 includes voice recognition circuitry for recognizing voice commands of the user for controlling the mobile phone. Such voice recognition circuitry is known in the art per se as, for example, disclosed in U.S. Pat. No. 5,335,313.

The receiver 92 receives wireless signals from an antenna 96 mounted within the base station 54 and the transmitter 94 transmits signals to the antenna 96. The wireless communication between the base station 54 and the wireless headset module 10 in the embodiments depicted in FIGS. 1A to 9 can be by means of magnetic inductive coupling. This means of transmission has many advantages including very low interference and low power requirements. A description of this type of communication can be found in U.S. Pat. No. 5,568,516. Where relatively larger distances exist between the wireless headset module and the base station, the wireless communication can be by means of radio frequency transmissions.

The components 88 through 96 described above are all a part of the transceiver circuit 74 of the base stations 54, 54', 54" and 54'''.

Within the wireless headset module 10 there is a transmitter and receiver antenna 98 which, as mentioned above, is essentially the body of the microphone boom 16. The antenna 98 is connected to the transceiver module 20 which includes a wireless headset module receiver 100 and a wireless headset module transmitter 102. The receiver circuit 100 is connected to supply audio signals to an audio amplifier 104 which is also connected to the microphone 18 and the speaker 24. Similarly, the transmitter 102 is supplied with audio signals from the audio circuit 104 and supplies wireless transmission signals to the antenna 98. The wireless headset module 10 is powered by the battery module 22.

A control logic circuit 106 controls all of the elements 100, 102 and 104 within the wireless headset module 10. The control logic circuit 106 is also connected to the on/off switch 26, the volume control 28, and the channel select switch 30.

The elements 100 to 106, inclusive, are all part of the transceiver module 20.

Having thus described several illustrative embodiments of the invention, various alterations, modifications and improvements will readily occur to those skilled in the art. Such alternatives, modifications, and improvements are intended to be within the spirit and scope of this invention. Accordingly, the foregoing description is by way of example only and is not intended as limiting. The invention is limited only as defined in the following claims an equivalents thereof.

What is claimed is:

1. A wireless headset system for wirelessly communicating between a base station and a wireless headset worn by a user, wherein: the wireless headset includes:
    an ear piece;
    an ear hook attached to the ear piece and which fits over the ear of a user;
    a speaker mounted in the ear piece and positioned to reproduce sounds into the ear of the user;
    a boom having one end mounted to one end of the ear piece;
    a microphone mounted on another end of the boom;
    first transceiver mounted to another end of the ear hook and electrically connected to the speaker and the microphone for wirelessly communicating signals representative of audio signals between the wireless headset and the base station; and
    a battery pack detachably mounted on the first transceiver; and the base station includes:
    a power interface for releasably coupling the base station to an external source of electrical power;
    a phone interface for electronically coupling the base station to a mobile phone that is physically proximate to the base station to allow the base station to communicate with the mobile phone;
    a second transceiver for wirelessly communicating with the first transceiver; and
    a battery pack interface for interfacing with a battery pack capable of powering the base station when it is not connected to an external power source and capable of being recharged when the base station is connected to an external power source.

2. The wireless headset system according to claim 1, wherein the phone interface allows for recharging batteries of the mobile phone.

3. The wireless headset system according to claim 1, wherein the base station is portable and is constructed to have a built-in:
    clip for attaching the base station to an article of clothing of the user; and
    holster for securely holding the mobile phone.

4. The wireless headset system according to claim 3, wherein the base station acts as a holster for the mobile phone.

5. The wireless headset system according to claim 3, wherein the first transceiver and the second transceiver wirelessly communicate via magnetic inductive coupling.

6. The wireless headset system according to claim 1, wherein the base station is portable and the mobile phone includes a holster for mounting the mobile phone on the user and further wherein the base station is detachably connected to the mobile phone while the mobile phone is mounted in its holster.

7. The wireless headset system according to claim 1, wherein the first transceiver and the second transceiver wirelessly communicate via magnetic inductive coupling.

8. The wireless headset system according to claim 1, wherein the ear hook is deformable toward the speaker and the speaker is non-pivotally mounted on the ear piece, whereby the ear hook can be deformed to clamp the pinna of a user's ear between the ear hook and the speaker.

9. The wireless headset system according to claim 1, wherein the ear hook is non-deformable toward the speaker and the speaker is pivotally mounted on the ear piece, whereby the speaker can be pivoted toward the ear hook to clamp the pinna of a user's ear between the ear hook and the speaker.

10. The wireless headset system according to claim 1, wherein the boom includes an antenna for the first transceiver.

11. The wireless headset system according to claim 1, wherein the wireless headset includes a power on/off switch for the first transceiver.

12. The wireless headset system according to claim 1, wherein the first transceiver and the second transceiver communicate over a selected one of a plurality of transmission channels and wherein the wireless headset further comprises a channel selector for selecting one of the plurality of transmission channels.

13. The wireless headset system according to claim 12, wherein the first transceiver and the second transceiver wirelessly communicate via magnetic inductive coupling.

14. The wireless headset system according to claim 1, wherein the power interface releasably attaches to a power cord connected to a cigarette lighter adapter for plugging into a cigarette lighter socket of a user's automobile.

15. A modular wireless headset system for wirelessly communicating between a base station and a wireless headset module worn by a user, wherein:
the wireless headset module includes:
  an ear piece;
  a speaker detachably mounted in the ear piece and positioned to reproduce sounds into the ear of the user;
  a boom having one end rotatably mounted to one end of the ear piece;
  a microphone mounted on another end of the boom;
  a transceiver module detachably mounted to another end of the ear hook and electrically connected to the speaker and the microphone for wirelessly communicating signals representative of audio signals between the wireless headset module and the base station; and
  a battery pack module detachably mounted on the transceiver module; and
the base station includes:
  a power interface for releasably coupling the base station to an external source of electrical power;
  a phone interface for electronically coupling the base station to a phone to allow the base station to communicate with the phone; and
  a transceiver circuit for wirelessly communicating with the transceiver module.

16. The modular wireless headset system according to claim 15, wherein the base station includes a battery pack interface for interfacing with another battery pack module which is capable of powering the base station when the base station is not connected to an external source of power and capable of being recharged when the base station is connected to an external source of power.

17. The modular wireless headset system according to claim 15, wherein the phone interface electronically couples the base station to a mobile phone that is physically proximate to the base station.

18. The modular wireless headset system according to claim 17, wherein the base station is portable and is constructed to include a built-in:
  clip for attaching the base station to an article of clothing of the user; and
  socket for securely holding the mobile phone.

19. The wireless headset system according to claim 18, wherein the base station acts as a holster for the mobile phone.

20. The wireless headset system according to claim 17, wherein the base station is portable and the mobile phone includes a holster for mounting the mobile phone on the user and further wherein the base station is detachably connected to the mobile phone while the mobile phone is mounted in its holster.

21. The modular wireless headset system according to claim 17, wherein the transceiver module and the transceiver circuit wirelessly communicate via magnetic inductive coupling.

22. The modular wireless headset system according to claim 15, wherein the transceiver module and the transceiver circuit wirelessly communicate via radio frequency signals.

23. The modular wireless headset system according to claim 15, wherein the ear hook is deformable toward the speaker and the speaker is non-pivotally mounted on the ear piece, whereby the ear hook can be deformed to clamp the pinna of a user's ear between the ear hook and the speaker.

24. The modular wireless headset system according to claim 15, wherein the ear hook is non-deformable toward the speaker and the speaker is pivotally mounted on the ear piece, whereby the speaker can be pivoted toward the ear hook to clamp the pinna of a user's ear between the ear hook and the speaker.

25. The modular wireless headset system according to claim 15, wherein the speaker can be detached from the ear piece, rotated 180°, and reattached to the ear piece whereby the wireless headset module can be worn on either ear of the user and with the speaker being directed into the auditory canal of the user's left ear or right ear.

26. The modular wireless headset system according to claim 15, wherein the boom includes an antenna for the transceiver module.

27. The modular wireless headset system according to claim 15, wherein the wireless head set module includes a power on/off switch for the transceiver module.

28. The modular wireless headset system according to claim 15, wherein the transceiver module and the transceiver circuit communicate over a selected one of a plurality of transmission channels and wherein the wireless headset module further comprises a channel selector for selecting the one of the plurality of transmission channels.

29. The modular wireless headset system according to claim 15, wherein power interface releasably attaches to a power cord connected to a cigarette lighter adapter for plugging into a cigarette lighter socket of a user's automobile.

30. The wireless headset system according to claim 29, wherein the first transceiver and the second transceiver wirelessly communicate via magnetic inductive coupling.

* * * * *